(12) United States Patent
Janny

(10) Patent No.: US 11,401,097 B2
(45) Date of Patent: Aug. 2, 2022

(54) DEVICE FOR SELECTING GASES FOR A CONTAINER FOR STORING PERISHABLE PRODUCTS

(71) Applicant: JANNY SARL, Peronne (FR)

(72) Inventor: Pierre Janny, Peronne (FR)

(73) Assignee: JANNY SARL, Peronne (FR)

( * ) Notice: Subject to any disclaimer, the term of this patent is extended or adjusted under 35 U.S.C. 154(b) by 442 days.

(21) Appl. No.: 16/341,984

(22) PCT Filed: Oct. 13, 2017

(86) PCT No.: PCT/FR2017/052823
§ 371 (c)(1),
(2) Date: Apr. 15, 2019

(87) PCT Pub. No.: WO2018/073514
PCT Pub. Date: Apr. 26, 2018

(65) Prior Publication Data
US 2019/0248565 A1    Aug. 15, 2019

(30) Foreign Application Priority Data
Oct. 19, 2016   (FR) ................................ 16 60134

(51) Int. Cl.
*B65D 81/20* (2006.01)
*A23B 7/148* (2006.01)

(52) U.S. Cl.
CPC .......... *B65D 81/2069* (2013.01); *A23B 7/148* (2013.01); *A23V 2002/00* (2013.01)

(58) Field of Classification Search
CPC .. B65D 81/2069; A23B 7/148; A23V 2002/00

USPC ........................................................ 454/173
See application file for complete search history.

(56) References Cited

U.S. PATENT DOCUMENTS

2019/0161238 A1*  5/2019  Uchimura .............. B65D 85/50

FOREIGN PATENT DOCUMENTS

| FR | 2 686 577 A1 |   | 7/1993 |            |
|----|--------------|---|--------|------------|
| FR | 2686577 A1   | * | 7/1993 | B65D 81/24 |
| FR | 2872800 A1   | * | 1/2006 | B65D 51/1616 |
| WO | 2005/074466 A2 | | 8/2005 |          |

(Continued)

OTHER PUBLICATIONS

International Search Report dated Jan. 22, 2018 in corresponding International application No. PCT/FR2017/052823; 5 pages.

(Continued)

*Primary Examiner* — Allen R. B. Schult
(74) *Attorney, Agent, or Firm* — Maier & Maier, PLLC

(57) ABSTRACT

A gas-selection device for a sealed storage container with modified or controlled atmosphere, remarkable in that it includes a hollow body and at least one first orifice, a second orifice and a first membrane, said first and second orifices connecting the inside of said body to the outside, said first membrane being disposed inside said body between said first and second orifices so that the gases flowing from the first orifice to the second orifice, or vice versa, necessarily and solely pass through said first membrane, and in that the device is arranged so as to be secured sealingly to one of the walls of the container, so as to allow a flow of gas from its second orifice through the wall, or vice versa.

20 Claims, 4 Drawing Sheets

(56) References Cited

FOREIGN PATENT DOCUMENTS

WO    2007/016427 A2    2/2007

OTHER PUBLICATIONS

Written Opinion of the International Searching Authority dated Jan. 22, 2018 in corresponding International application No. PCT/FR2017/052823; 9 pages.

* cited by examiner

DEVICE FOR SELECTING GASES FOR A CONTAINER FOR STORING PERISHABLE PRODUCTS

FIELD

The present invention relates to the technical field of sealed storage containers with modified or controlled atmosphere comprising a space in which perishable products to be preserved are stored.

BACKGROUND

The use of such sealed containers is known, in particular for storing perishable products, such as for example fruits and vegetables, mushrooms or flowers, in a modified or controlled atmosphere, in order to increase the storage life of these products. The sealing of this type of container is very important since it makes it possible to maintain in said container the required levels of oxygen and carbon dioxide to guarantee the best possible storage life.

However, in this type of container, it is also very important to control the passage, selectively, of the gases of the external and internal ambient air, in order to provide a modified or controlled atmosphere inside said container, so as to increase the storage life of the products contained in it, said passage of the gases being dependent on the internal volume of said container and the type of product contained in the vessel.

SUMMARY

The aim of the present invention is to propose a gas-selection device making it possible to obtain a modified or controlled atmosphere inside a sealed storage container comprising at least one space containing perishable products such as for example fruits and vegetables, or flowers. Said gas-selection device according to the invention makes it possible to quickly and simply adapt exchanges between the inside of said container and the gases of the external and internal ambient air, selectively, according to the dimensions of the container and/or the products to be stored.

In accordance with the invention, there is therefore proposed a gas-selection device for a sealed storage container with modified or controlled atmosphere for storing perishable products such as for example fruits and vegetables, or flowers, comprising a hollow body and at least one first orifice, a second orifice and a first membrane, said first and second orifices connecting the inside of said body with the outside thereof, said first membrane being disposed inside said body between said first and second orifices so that the gases flowing from the first orifice to the second orifice, or vice versa, necessarily and solely pass through said first membrane, said body comprising at least one first casing provided with at least said first orifice and a second casing provided with at least said second orifice, said gas-selection device being remarkable in that said second casing comprises, in line with the second orifice, a hollow cylindrical tube projecting towards the outside of the body and being arranged so as to be inserted in an orifice provided on one of the walls of the container connecting the inside of the container to the outside thereof, in order to secure the gas-selection device, sealingly, to said wall of the container, in line with said orifice, so as to allow a flow of gas from its second orifice through said orifice in the wall, or vice versa.

The hollow cylindrical tube extends beyond said wall in which it is arranged so as to be inserted.

Advantageously, the tube is provided at its free end with a fixing member able to cooperate with a complementary fixing member so as to allow the non-permanent securing of the second casing to said wall.

Even more advantageously, the gas-selection device comprises a gasket arranged so as to be compressed between the wall of the container and the second casing, when the gas-selection device is secured to the container.

According to a preferred embodiment, said first and second casings are assembled sealingly together and the first membrane is placed so that its perimeter edge is gripped sealingly between the respective perimeter edges of said first and second casings.

According to a variant embodiment, the second casing comprises an orifice corresponding to the third orifice of the body and connecting the inside of the second casing to the outside thereof, the body comprises, between the first casing and the second casing, two roughly tubular third casings and a fourth casing disposed between said third casings and comprising at least one transverse orifice corresponding to the fourth orifice in the body and connecting the inside of said fourth casing to the outside thereof, and the gas-selection device comprises a second membrane and two third membranes disposed inside said body so that the gases that flow from the first, third and fourth orifices in the body to the second orifice in said body, or vice versa, necessarily and solely pass through respectively the first, second and third membranes.

According to another variant embodiment, the body comprises, between the first casing and the second casing, a roughly tubular third casing and a fourth casing comprising at least one transverse orifice corresponding to the third orifice in the body and connecting the inside of said fourth casing with the outside thereof, and the gas-selection device comprises two second membranes disposed inside said body so that the gases that flow from said first and third orifices in the body to the second orifice in said body, or vice versa, necessarily and solely pass through respectively the first and second membranes.

Advantageously, each membrane is pleated.

According to a last variant embodiment, the gas-selection device comprises two second orifices and is associated in series with at least one identical gas-selection device so as to connect together one of their two second orifices by means of at least one sheath, the assembly thus obtained then being firstly sealingly secured to one of the walls of the container, in line with two orifices provided on said wall, and connecting the inside of the container with the outside thereof, so as to allow a flow of gas from the second free orifices, through said associated orifice in the wall, or vice versa, and secondly connected, at one of its free ends, to blowing means, in order to create forced ventilation inside the two gas-selection devices and the sealed container.

BRIEF DESCRIPTION OF THE FIGURES

Other advantages and features will emerge better from the following description of an embodiment of a gas-selection device for a sealed storage container with modified or controlled atmosphere for perishable products according to the invention with reference to the accompanying figures, on which.

DETAILED DESCRIPTION

Figure 1:
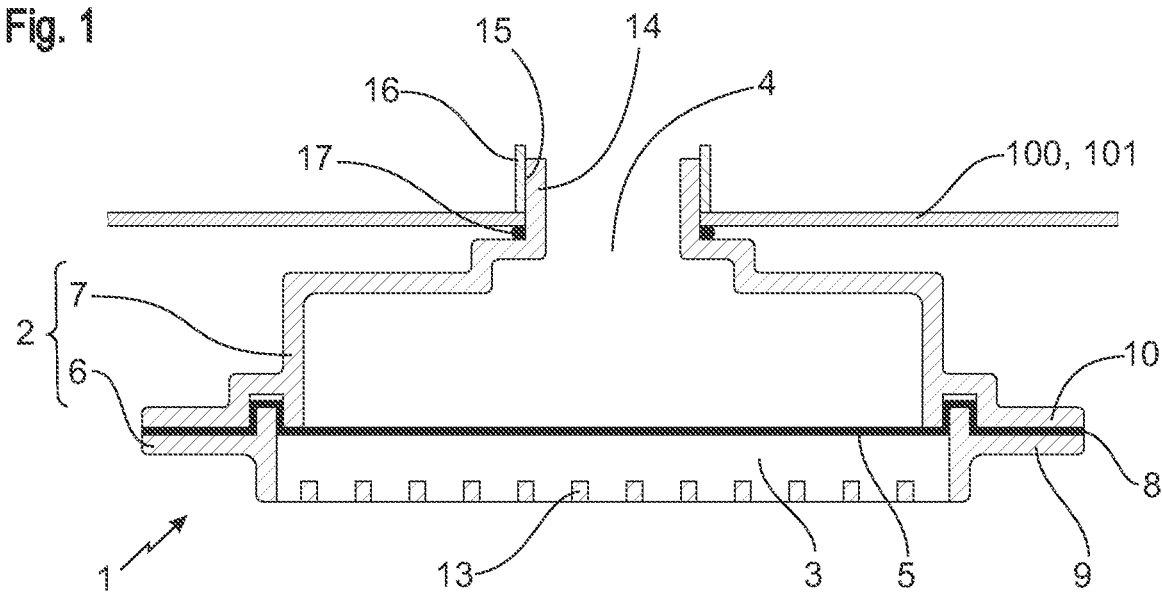
FIG. 1 is a schematic view in cross section of a gas-selection device according to the invention.
Figure 2:
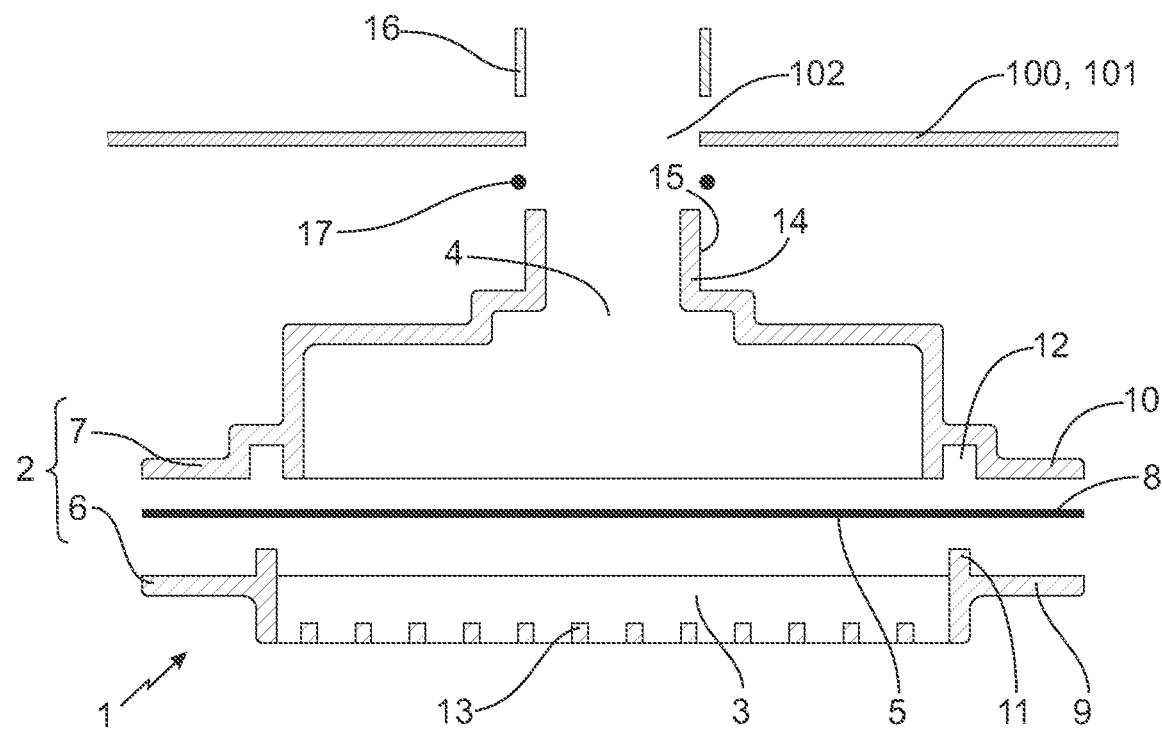
FIG. 2 is an exploded schematic view in cross section of a gas-selection device of FIG. 1.

With reference to FIGS. 1 to 2, the invention relates to a gas-selection device 1 for a sealed storage container 100 with modified or controlled atmosphere for storing perishable products such as for example fruit and vegetables, or flowers, not shown in the figures.

The gas-selection device 1 comprises a hollow body 2 and at least one first orifice 3, a second orifice 4 and first membrane 5, said first and second orifices 3, 4 connecting the inside of said body 2 to the outside thereof, said first membrane 5 being disposed inside said body 2 between said first and second orifices 3, 4 so that the gases flowing from the first orifice 3 to the second orifice 4, or vice versa, necessarily and solely pass through said first membrane 5.

It will be understood clearly that the gas-selection device 1 may comprises a plurality of first orifices 3 and/or a plurality of second orifices 4 and/or a plurality of first membranes 5, without departing from the scope of the present invention.

Furthermore, the gas-selection device 1 is arranged so as to be secured, sealingly and preferably removably, to one 101 of the walls of the container 100, in line with an orifice 102 provided on said wall 101 and connecting the inside of the container 100 with the outside thereof, so as to allow a flow of gas from its second orifice 4 through said orifice 102, or vice versa.

According to a preferred embodiment, the body 2 of the gas-selection device 1 comprises a first casing 6 provided at least with the first orifice 3 and a second casing 7 provided with at least the second orifice 4, said first and second casings 6, 7 being assembled sealingly together.

In this configuration, the first membrane 5 is placed so that its perimeter edge 8 is sealingly gripped between said first and second casings 6, 7 and preferably between their respective perimeter edges 9, 10. To ensure a perfect seal at the first membrane 5, the first casing 6 comprises, along its perimeter edge 9, connection means 11 cooperating with complementary connection means 12 disposed along the perimeter edge 10 of the second casing 7. The connection means 11 and the complementary connection means 12 are respectively male and female members or female and male members, the male member preferably being a rim extending perpendicularly from the associated perimeter edge and the female member preferably being a groove provided in the associated perimeter edge.

The first casing 6 preferably comprises, in line with the first orifice 3, a grille 13 in order to provide mechanical protection for the membrane 6 against impacts while allowing the flow of gases.

According to this preferred embodiment, the second casing 7 comprises, in line with the second orifice 4, a hollow cylindrical tube 14 extending so as to project towards the outside of the body 2 of the gas-selection device 1 and being arranged so as to be inserted in the orifice 102 of the wall 101 of the container 100 and to extend beyond said wall 101. This tube 14 is provided at its free end with a fixing member 15 able to cooperate with a complementary fixing member 16 in order to secure the second casing 7 non-permanently to said wall 101, and consequently the gas-selection device 1 to said container 100.

Thus, with reference to FIG. 1, when the tube 14 is inserted in the orifice 102 in the wall 101 of the container 100, its free end is then situated on the other side of said wall 101 and the fixing member 15 and the complementary fixing member 16 cooperate together so as to exert a force on the gas-selection device 1 tending to apply the second casing 7 against the wall 101 and therefore to secure the assembly consisting of device and container 100. To provide the impermeability of this securing, a gasket 17, advantageously an O-ring seal, is disposed around the tube 14 and arranged so as to be compressed between the second casing 7 and the wall 101, when the gas-selection device 51 is secured to the container.

The fixing member 15 and the complementary fixing member 16 are respectively a thread and a nut. However, the fixing member 15 and the complementary fixing member 16 could be any other suitable equivalent type such as for example quick couplings similar to those used on fire-brigade equipment or clip/groove assemblies, without departing from the scope of the present invention.

It will be understood clearly that the fixing member 15, the complementary fixing member 16 and the gasket 17 make it possible to secure the gas-selection device 1 to the container 100 sealingly and non-permanently.

However, it will also be understood clearly that the gas-selection device 1 may be secured to the container 100 sealingly and permanently by any suitable technique such as for example welding, adhesive bonding or crimping.

It will be understood clearly that the gas-selection device 1 according to the invention makes it possible to quickly and simply adapt the exchanges, with the inside of said container 100, of gas from external ambient air, selectively, according to the dimensions of the container and/or the products to be stored. This is because, once the container 100 is manufactured, it suffices either to produce an orifice 102 in one of the walls 101 of said container 100 and to secure a gas-selection device 1 of suitable dimensions, or to produce a plurality of orifices 102 in only one or a plurality of the walls 101 of said container 100 and to secure, in line with each orifice 102, a gas-selection device 1 of smaller dimensions, the latter configuration allowing a more homogeneous distribution of the gas flows inside said container 100.

A person skilled in the art will have no difficulty in determining and sizing each membrane according to the required atmosphere inside the container and the products contained therein.

Finally, because of the configuration of the gas-selection device 1, it will be understood clearly that the latter may indifferently be secured to a wall 101 of the container 100 either inside or outside said container 100.

Figure 3:
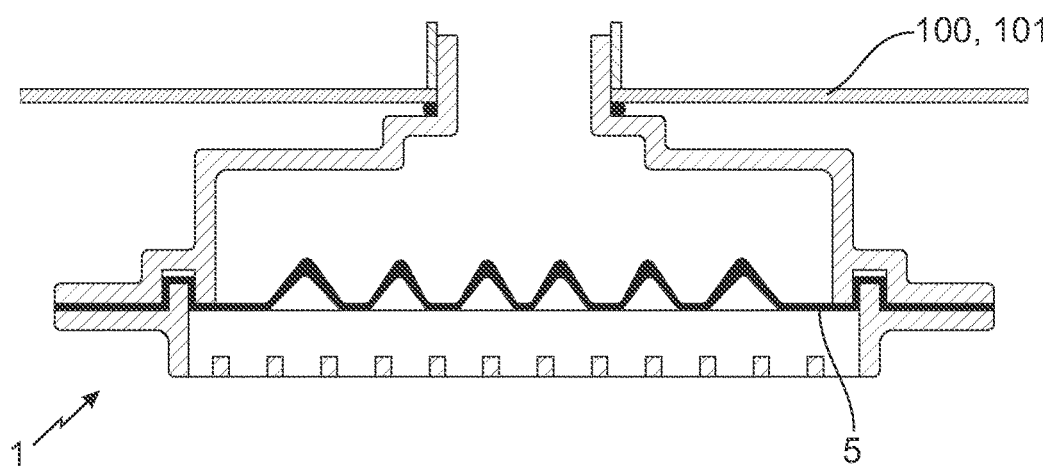
FIG. 3 is a partial schematic view in cross section of a first variant of the gas-selection device according to the invention.

According to a first variant embodiment shown in FIG. 3, in order to increase the gas-selection surface area of the gas-selection device 1 without having to increase the overall dimensions thereof, the first membrane 5 is advantageously pleated.

Figure 4:
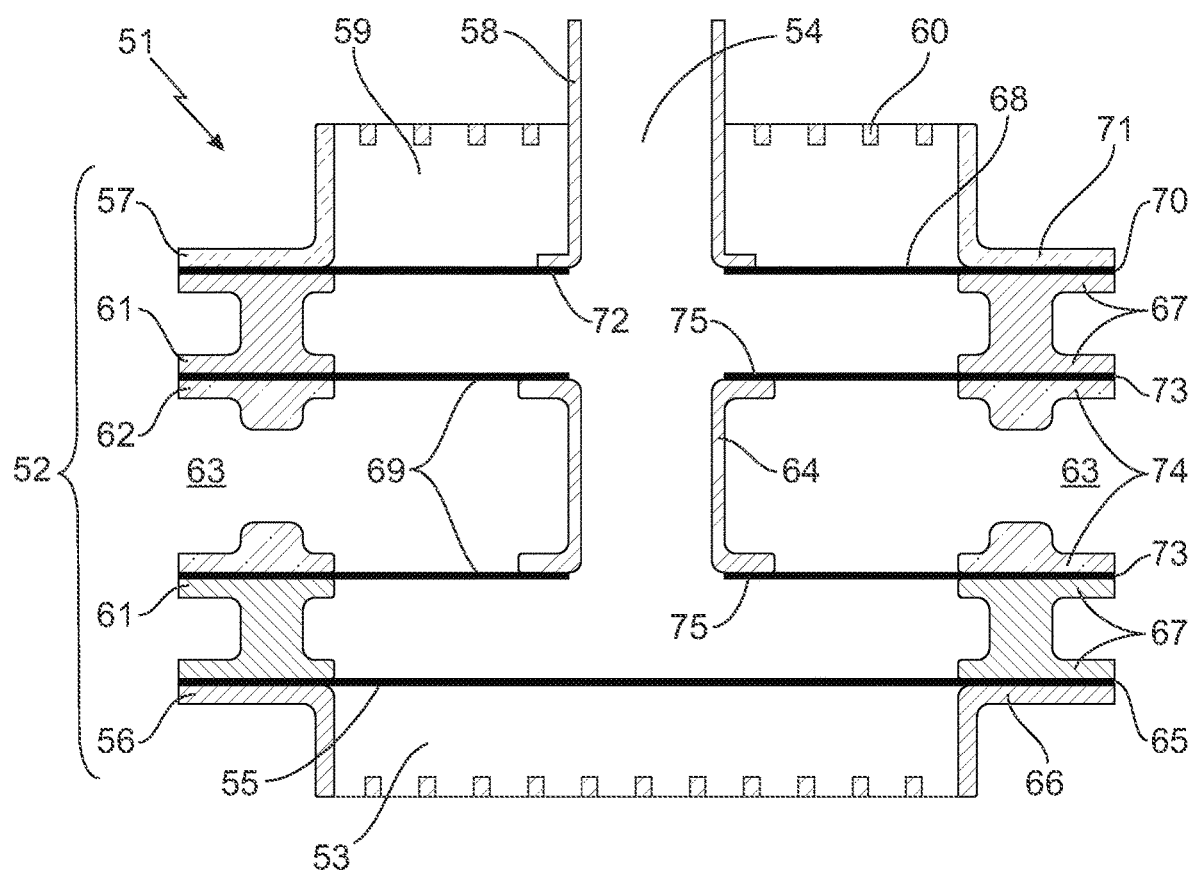
FIG. 4 is a partial schematic view in cross section of a second variant of the gas-selection device according to the invention.

According to a second variant embodiment shown in FIG. 4, the gas-selection device 51 comprises a body 52 provided with at least one first orifice 53, a second orifice 54 and a first membrane 55 all similar to those described previously.

Moreover, the body 52 comprises a first casing 56 provided at least with the first orifice 53 and a second casing 57 provided at least with the second orifice 54.

The first casing 56 is identical to the first casing 6 described previously.

The second casing 57 is similar to the first casing 6 described previously and comprises a hollow cylindrical tube 58 disposed in line with the second orifice 54 and extending so as to project towards the outside of the body 52.

However, in this variant embodiment, said tube 58 is also extended inside said second casing 57 over its entire thickness. The second casing 57 also comprises an orifice corresponding to the third orifice 59 in the body 52 and connecting the inside of the second casing 57 of said body 52 to the outside of the latter and preferably comprising a protective grille 60.

The tube 58 is preferably provided at its external free end with a fixing member, not shown in FIG. 4, able to cooperate with a complementary fixing member, not shown in FIG. 4, in order to non-permanently secure the second casing 57 to a wall of the container, not shown in FIG. 4, and consequently to secure the gas-selection device 51 to said container.

Likewise, the gas-selection device 51 advantageously comprises a gasket, not shown in FIG. 4, arranged so as to be compressed between said wall of the container and the second casing 57, when the gas-selection device 51 is secured to the container.

In addition, this variant embodiment differs from the previous embodiment in that the body 52 also comprises, between the first casing 56 and the second casing 57, two roughly tubular third casings 61 and a fourth casing 62 disposed between said third casings 61. Said casings 56, 57, 61, 62 of the body 52 are connected together sealingly.

The fourth casing 62 comprises at least one transverse orifice corresponding to the fourth orifice 63 of the body 52 and connecting the interior of said fourth casing 62 to the outside thereof, and a transfer tube 64 passing right through the fourth casing 62 in the direction of its thickness, so as to allow a flow of gas through said fourth casing 62.

In this second variant embodiment, the first membrane 55 is fitted so that its external perimeter edge 65 is sealingly gripped between the first casing 56 and one of the third casings 61 and preferably between their respective perimeter edges 66, 67.

Moreover, the gas-selection device 51 comprises a second membrane 68 and two third membranes 69 similar to the first membrane 55 and roughly annular in shape.

The second membrane 68 is placed so that firstly its external perimeter edge 70 is gripped sealingly between the second casing 57 and one of the third casings 61 and preferably between their respective perimeter edges 71, 67, and secondly so that its internal perimeter edge 72 is fixed sealingly around the free end of the tube 58 situated inside said second casing 57, by any suitable means such as adhesive bonding for example.

Each third membrane 69 is placed firstly so that its external perimeter edge 73 is sealingly gripped between one of the third casings 61 and the fourth casing 62 and preferably between their respective perimeter edges 67, 74, and secondly so that its internal perimeter edge 75 is fixed sealingly around one of the free ends of the transfer tube 64, by any suitable means such as adhesive bonding for example.

Thus configured, the gas-selection device 51 guarantees that the gases that flow from the first, third and fourth orifices 53, 59, 63 of the body 52 to the second orifice 54 of said body 52, or vice versa, necessarily and solely pass through respectively the first, second and third membranes 55, 65, 66.

It will be understood clearly that this variant embodiment makes it possible to increase the gas-selection surface area of the gas-selection device 51 without having to considerably increase the overall dimensions thereof. It optionally makes it possible to fit membranes of various designs.

Figure 5:
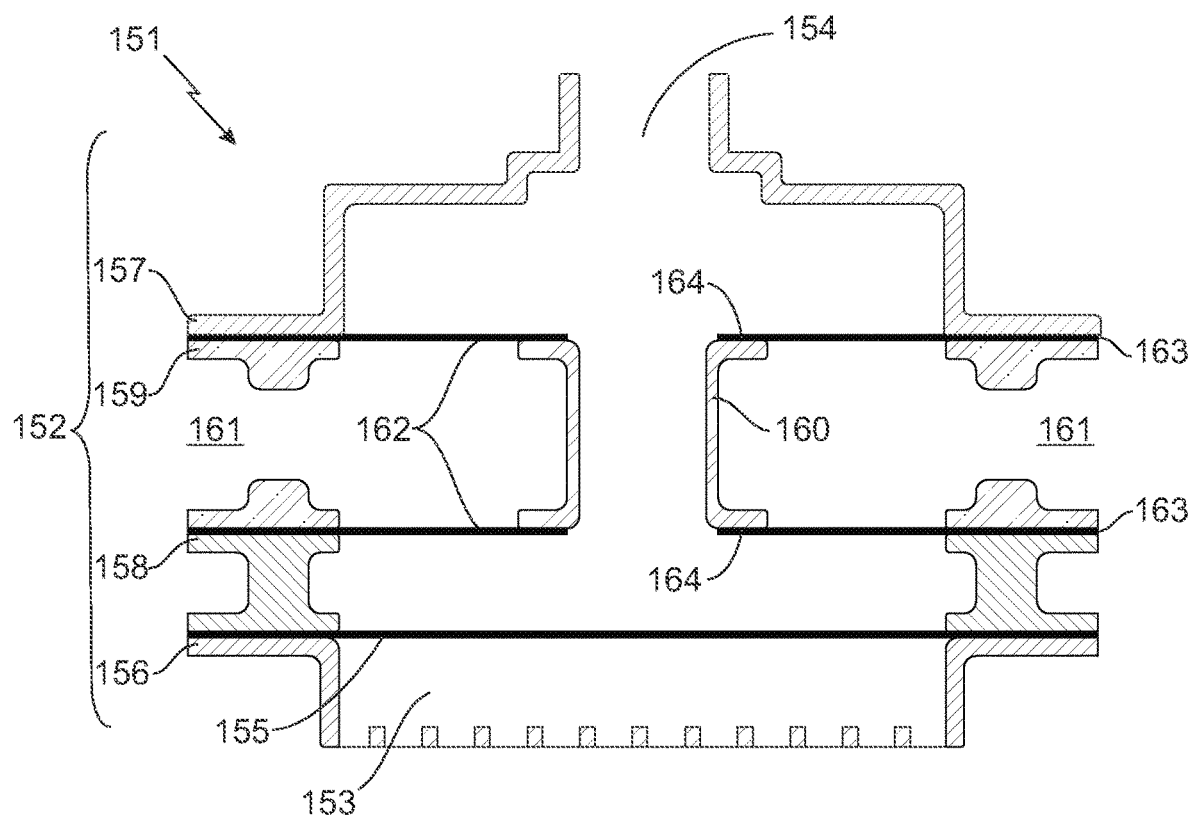
FIG. 5 is a partial schematic view in cross section of a third variant of the gas-selection device according to the invention.

According to a third more minimalist variant shown in FIG. 5, the gas-selection device 151 comprises a body 152 provided with at least one first orifice 153, a second orifice 154 and a first membrane 155 similar to those described previously.

Moreover, the body 152 comprises a first casing 156 provided with at least the first orifice 153 and a second casing 157 provided with at least the second orifice 154. The first and second casings 156, 157 are identical to the first and second casings 6, 7 previously described.

The body 152 further comprises, between the first casing 156 and the second casing 157, a third roughly tubular casing 158 and a fourth casing 159, the third and fourth casings 158, 159 being identical to the third and fourth casings 61, 62 previously described. Thus the fourth casing 159 comprises a transfer tube 160 and at least one orifice corresponding to the third orifice 161 in the body 52. Said casings 156, 157, 158, 159 of the body 152 are assembled together sealingly.

Likewise, the gas-selection device 151 comprises two second membranes 162 identical to the third membranes 69 previously described.

Each second membrane 162 is placed so that firstly its external perimeter edge 163 is gripped sealingly between the fourth casing 159 and the third casing 158 or the second casing 157, preferably, between their respective perimeter edges, and secondly so that its internal perimeter edge 164 is fixed sealingly around one of the free ends of the transfer tube 160 of the fourth casing 159, by any suitable means such as adhesive bonding for example.

Thus configured, the gas-selection device 151 guarantees that the gases that flow from the first and third orifices 152, 161 of the body 152 to the second orifice 154 of said body 152, or vice versa, necessarily and solely pass respectively through the first and second membranes 155, 162.

Moreover, it can be imagined further increasing the filtering surface of the gas-selection device 51, 151 by adding one or more new stages each comprising a third casing, a fourth casing and an additional membrane identical respectively to the third casing 61, 158, fourth casing 62, 159 and membrane 66, 162 previously described.

Figure 6:
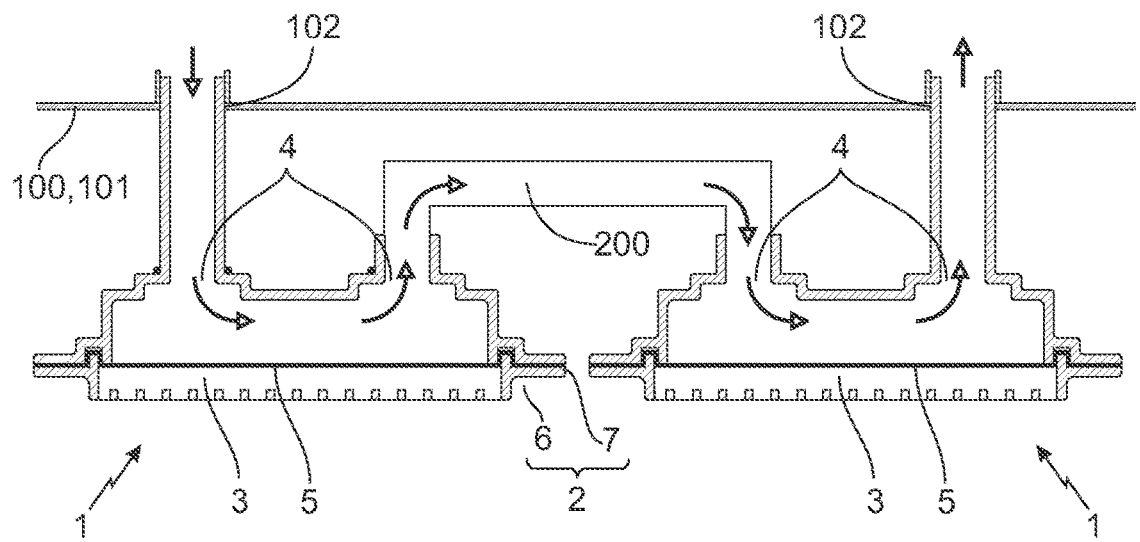
FIG. 6 is a partial schematic view in cross section of a fourth variant of the gas-selection device according to the invention.

According to a fourth variant shown in FIG. 6, at least two gas-selection devices 1, as previously described, disposed in series, are placed on the sealed container 100. Thus each gas-selection device 1 comprises a body 2 provided with at least one first orifice 3, a second orifice 4 and a first membrane 5.

Moreover, the body 2 comprises a first casing 6 provided at least with the first orifice 3 and a second casing 7 provided at least with the second orifice 4.

However, in this variant embodiment, each gas-selection device 1 comprises two second orifices 204.

This configuration makes it possible to associate in series the at least two gas-selection devices 1 by means of at least one sheath 200 connecting together one of their two second orifices 4, in accordance with FIG. 6. The assembly thus obtained is then secured sealingly to one 101 of the walls of the container 100, in line with two orifices 102, provided on said wall 101 and connecting the inside of the container 100 with the outside thereof, so as to allow a flow of gas from the second free orifices 4, that is to say those not connected to a sheath 200, through said associated orifice 102 in the wall 101, or vice versa.

Once secured to the container 100, the assembly consisting of gas-selection devices 1 and sheath 200 is then advantageously connected, at one of its ends, to blowing means, not shown, such as for example a fan, in order to create forced ventilation inside the two gas-selection devices 1 and the sealed container 100, in accordance with the arrows shown in FIG. 6 or vice versa, so as to promote the gaseous exchanges through the membrane 5 of each gas-selection device 1.

It will be understood clearly that the assembly consisting of gas-selection devices 1 and sheath 200 previously described may comprise more than two gas-selection devices 1 and therefore more than one sheath 200 without departing from the scope of the present invention.

Furthermore, it goes without saying that the gas-selection devices 1 could also be similar to the gas-selection devices 51 or 151 previously described and comprise at least one third casing, a fourth casing and an additional membrane identical respectively to the third casing 61, 158, fourth casing 62, 159 and membrane 66, 162 previously described.

Figure 7:
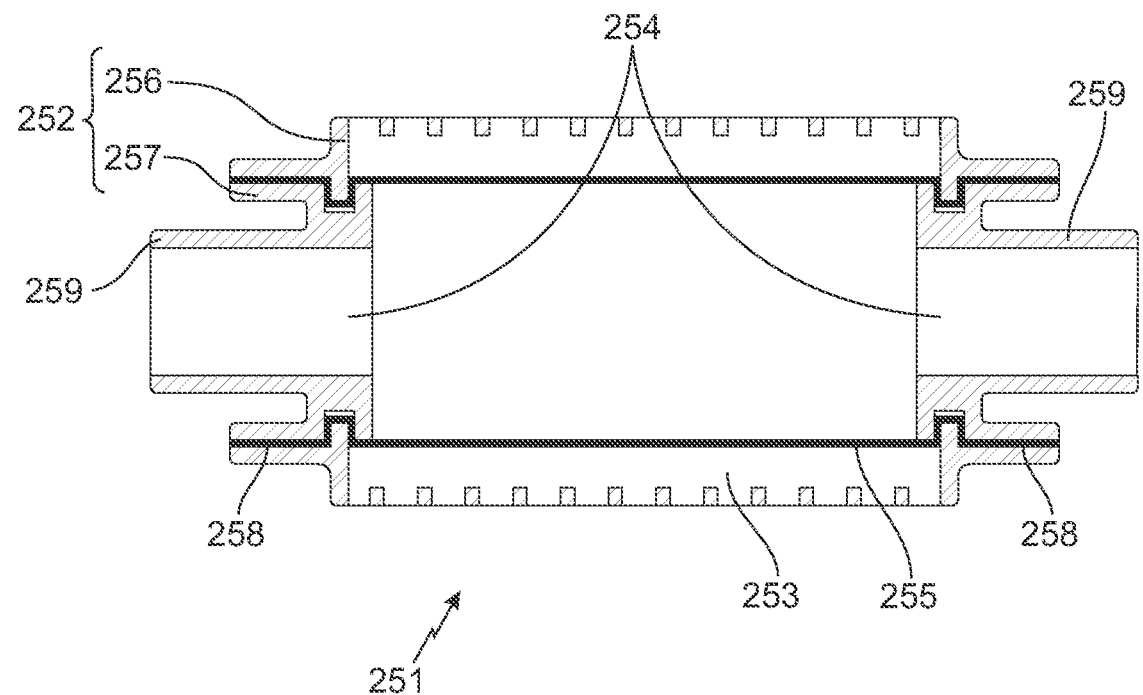
FIG. 7 is a partial schematic view in cross section of a last variant of the gas-selection device according to the invention.

Finally, according to a last variant shown in FIG. 7 and particularly suited to the arrangement in series of the gas-selection devices according to the invention, the gas-selection device 251 comprises a body 252 and at least one first radial orifice 253, two second axial orifices 254 and a first membrane 255, preferably tubular, disposed between said first and second orifices 253, 254. Said body 252 is in the rough form of a hollow cylindrical tube and comprises a cylindrical peripheral longitudinal wall 256 closed off by two transverse end walls 257, said longitudinal wall 256 being provided at least with the first orifice 253 and each transverse wall 257 being provided at least with the second orifice 254. In this configuration of the gas-selection device 251, the first membrane 255 is placed so that its end perimeter edges 258 are gripped, sealingly, between the transverse 257 and longitudinal 256 walls.

Each transverse wall 257 preferably comprises, in line with the second orifice 254, a hollow cylindrical tube 259 extending so as to project towards the outside of the body 252 of the gas-selection device 251 and being arranged so as to be inserted in an orifice in a wall of a container, not shown.

Figure 8:
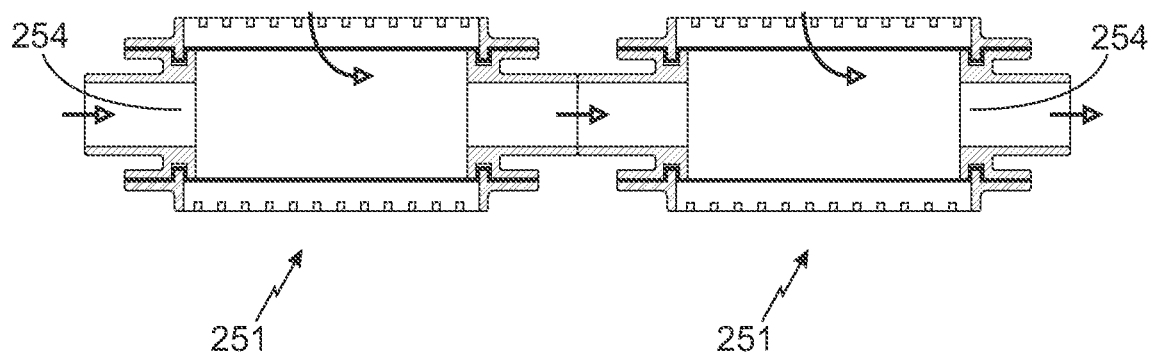
FIG. 8 is a schematic view of two gas-selection devices according to FIG. 7 put in series.

With reference to FIG. 8, it will be understood clearly that this variant easily allows an arrangement in series by putting at least two cylindrical gas-selection devices 251 end to end and connecting the second free orifices 254 of the assembly obtained to one of the walls of a container, not shown.

Once secured to the container, the gas-selection device assembly 251 is then advantageously connected, at one of its ends, to blowing means, not shown, such as for example a fan, in order to create forced ventilation inside the gas-selection device 251 and the container.

INDUSTRIAL APPLICABILITY

The gas-selection device 1 according to the invention applies particularly to the sealed storage container 100 with modified or controlled atmosphere comprising a rigid vessel in which the perishable products to be preserved are stored, such as for example fruits and vegetables, or flowers, and a cowl closing the vessel sealingly, but it may also be used on containers of the flexible cover type for packaging pallets or partially rigid protective covers.

Finally, it goes without saying that the examples of a gas-selection device 1 according to the invention that has just been described are merely particular illustrations, in no way limitative of the invention.

The invention claimed is:

1. A gas-selection device for a sealed storage container having a modified or controlled atmosphere for storing foodstuffs, comprising:
   a hollow body, at least one first orifice, at least one second orifice, and a first membrane,
   said at least one first orifice and said at least one second orifice connecting an inside of said body with an outside of said body,
   said first membrane being disposed inside said body between said at least one first orifice and said at least one second orifice so that gases flowing from the at least one first orifice to the at least one second orifice, or vice versa, necessarily and solely pass through said first membrane,
   said body comprising at least one first casing provided with said at least one first orifice and a second casing provided with said at least one second orifice,
   wherein said second casing further comprises, extending from an edge of the second orifice, a hollow cylindrical tube projecting towards the outside of the body and being arranged so as to be inserted in a container orifice provided on one of a plurality of walls of the container connecting an inside of the container to an outside of the container, in order to secure the gas-selection device, sealingly, to said wall of the container, in line with said container orifice, so as to allow a flow of gas from the at least one second orifice through said container orifice, or vice versa.

2. The gas-selection device according to claim 1, wherein the hollow cylindrical tube extends beyond the wall in which said hollow cylindrical tube is arranged so as to be inserted.

3. The gas-selection device according to claim 2, wherein the tube is provided at a free end of the tube with a fixing member able to cooperate with a complementary fixing member in order to secure the second casing non-permanently to said wall.

4. The gas-selection device according to claim 1, further comprising a gasket arranged so as be compressed between the wall of the container and the second casing when the gas-selection device is secured to the container.

5. The gas-selection device according to claim 1, wherein said first and second casings are assembled together sealingly and wherein the first membrane is placed so that a perimeter edge of the first membrane is gripped sealingly between respective perimeter edges of said first casing and said second casing.

6. The gas-selection device according to claim 1, wherein:
   the body further comprises at least one third orifice provided in the second casing and connecting an inside of the second casing to an outside of the second casing,
   the body further comprises, between the first casing and the second casing, two tubular third casings, a fourth casing disposed between said third casings, and at least one transverse fourth orifice defined in the fourth casing and connecting an inside of said fourth casing to an outside of said fourth casing, and the gas-selection device further comprises a second membrane and two third membranes disposed inside said body so that the gases that flow from the first, third and fourth orifices in the body to the second orifice in said body, or vice versa, necessarily and solely pass through respectively the first, second and third membranes.

7. The gas-selection device according to claim 1, wherein:
the body further comprises, between the first casing and the second casing, a tubular third casing, a fourth casing, and at least one transverse third orifice defined in the fourth casing and connecting an inside of said fourth casing with an outside of said fourth casing, and
the gas-selection device further comprises two second membranes disposed inside said body so that the gases that flow from the first and third orifices in the body to the second orifice in said body, or vice versa, necessarily and solely pass through respectively the first and second membranes.

8. The gas-selection device according to claim 1, wherein the first membrane is pleated.

9. The gas-selection device according to claim 1, further comprising two second orifices, wherein the device is associated in series with at least one further identical gas-selection device such that a one orifice of the two second orifices of the gas-selection device is connected to a one orifice of the two second orifices of the further gas-selection device by at least one sheath so as to form an assembly, the assembly being firstly sealingly secured to one of the walls of the container, in line with two container orifices provided on said wall, and connecting the inside of the container with the outside of the container, so as to allow a flow of gas from an other orifice of the two second orifices of the gas-selection device, through said associated orifice in the wall, or vice versa, and secondly connected, at an other orifice of the two second orifices of the further gas-selection device, to blowing means, in order to create forced ventilation inside the two gas-selection devices and the sealed container.

10. The gas-selection device according to claim 2, further comprising a gasket arranged so as be compressed between the wall of the container and the second casing when the gas-selection device is secured to the container.

11. The gas-selection device according to claim 3, further comprising a gasket arranged so as be compressed between the wall of the container and the second casing when the gas-selection device is secured to the container.

12. The gas-selection device according to claim 2, wherein said first and second casings are assembled together sealingly and wherein the first membrane is placed so that a perimeter edge of the first membrane is gripped sealingly between respective perimeter edges of said first casing and said second casing.

13. The gas-selection device according to claim 3, wherein said first and second casings are assembled together sealingly and wherein the first membrane is placed so that a perimeter edge of the first membrane is gripped sealingly between respective perimeter edges of said first casing and said second casing.

14. The gas-selection device according to claim 4, wherein said first and second casings are assembled together sealingly and wherein the first membrane is placed so that a perimeter edge of the first membrane is gripped sealingly between respective perimeter edges of said first casing and said second casing.

15. The gas-selection device according to claim 2, wherein:
the body further comprises at least one third orifice provided in the second casing and connecting an inside of the second casing to an outside thereof,
the body further comprises, between the first casing and the second casing, two tubular third casings, a fourth casing disposed between said third casings, and at least one transverse fourth orifice defined in the fourth casing and connecting an inside of said fourth casing to an outside of said fourth casing, and
the gas-selection device further comprises a second membrane and two third membranes disposed inside said body so that the gases that flow from the first, third and fourth orifices in the body to the second orifice in said body, or vice versa, necessarily and solely pass through respectively the first, second and third membranes.

16. The gas-selection device according to claim 3, wherein:
the body further comprises at least one third orifice provided in the second casing and connecting the inside of the second casing to the outside thereof,
the body further comprises, between the first casing and the second casing, two tubular third casings, a fourth casing disposed between said third casings, and at least one transverse fourth orifice defined in the fourth casing and connecting an inside of said fourth casing to an outside of said fourth casing, and
the gas-selection device further comprises a second membrane and two third membranes disposed inside said body so that the gases that flow from the first, third and fourth orifices in the body to the second orifice in said body, or vice versa, necessarily and solely pass through respectively the first, second and third membranes.

17. The gas-selection device according to claim 4, wherein:
the body further comprises at least one third orifice provided in the second casing and connecting an inside of the second casing to an outside thereof,
the body further comprises, between the first casing and the second casing, two tubular third casings, a fourth casing disposed between said third casings, and at least one transverse fourth orifice defined in the fourth casing and connecting the inside of said fourth casing to the outside of said fourth casing, and
the gas-selection device further comprises a second membrane and two third membranes disposed inside said body so that the gases that flow from the first, third and fourth orifices in the body to the second orifice in said body, or vice versa, necessarily and solely pass through respectively the first, second and third membranes.

18. The gas-selection device according to claim 2, wherein:
the body further comprises, between the first casing and the second casing, a tubular third casing, a fourth casing, and at least one transverse third orifice defined in the fourth casing and connecting an inside of said fourth casing with an outside of said fourth casing, and
the gas-selection device further comprises two second membranes disposed inside said body so that the gases that flow from the first and third orifices in the body to the second orifice in said body, or vice versa, necessarily and solely pass through respectively the first and second membranes.

19. The gas-selection device according to claim 3, wherein:
the body further comprises, between the first casing and the second casing, a tubular third casing, a fourth casing, and at least one transverse third orifice defined in the fourth casing and connecting an inside of said fourth casing with an outside of said fourth casing, and the gas-selection device further comprises two second membranes disposed inside said body so that the gases that flow from the first and third orifices in the body to the second orifice in said body, or vice versa, necessarily and solely pass through respectively the first and second membranes.

20. The gas-selection device according to claim 4, wherein:

the body further comprises, between the first casing and the second casing, a tubular third casing, a fourth casing, and at least one transverse third orifice defined in the fourth casing and connecting an inside of said fourth casing with an outside of said fourth casing, and the gas-selection device further comprises two second membranes disposed inside said body so that the gases that flow from the first and third orifices in the body to the second orifice in said body, or vice versa, necessarily and solely pass through respectively the first and second membranes.

\* \* \* \* \*